F. P. MURPHEY.
CORN PLANTER.
APPLICATION FILED JULY 30, 1910.
1,020,363.
Patented Mar. 12, 1912.
2 SHEETS—SHEET 1.
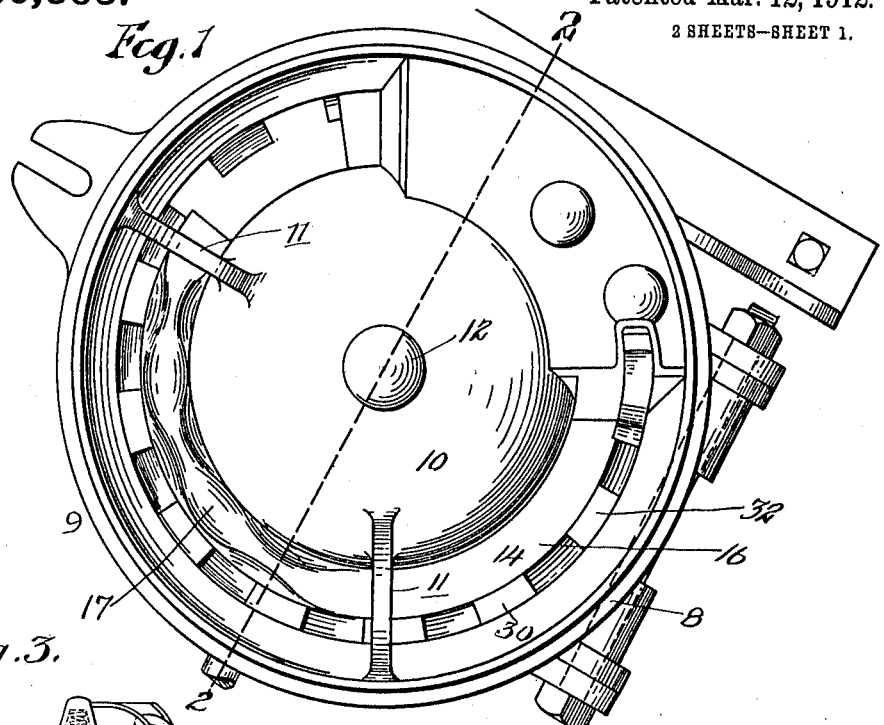
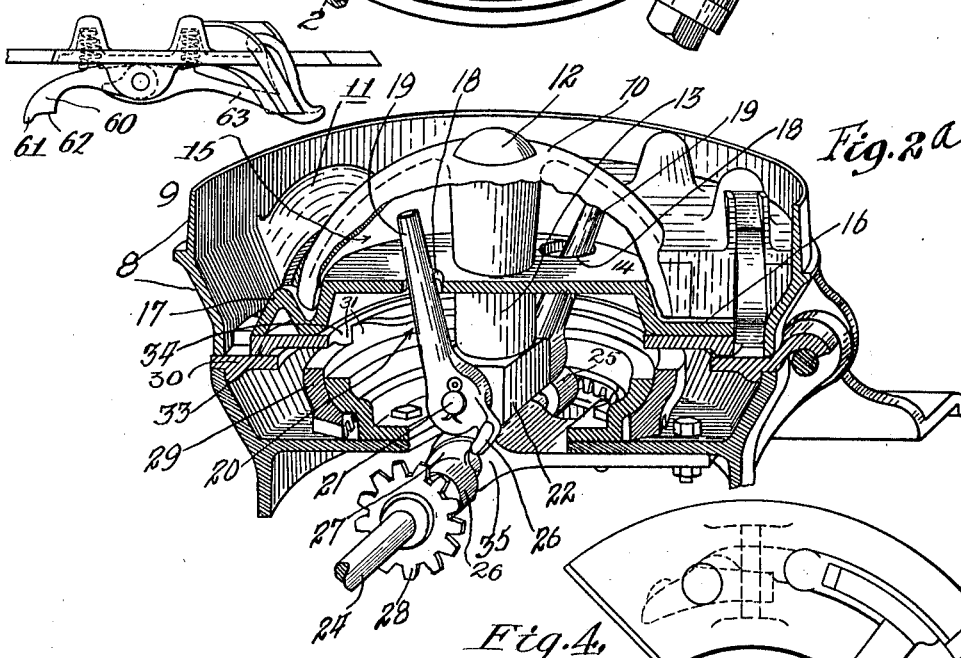
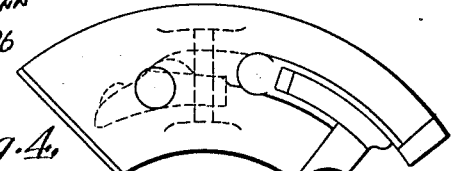
Witnesses:
Ephraim Banning.
Inventor:
Frank P. Murphey
By Banning & Banning
Attorneys.

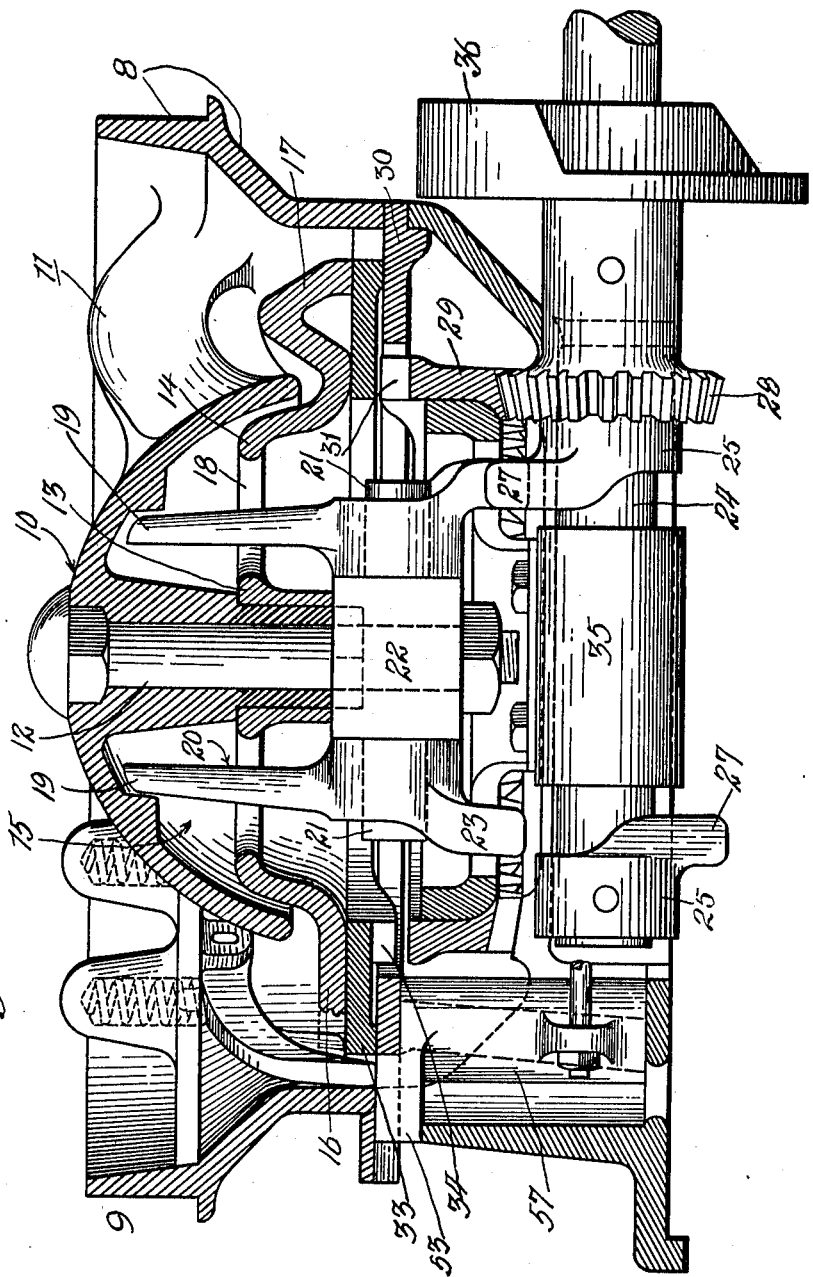

UNITED STATES PATENT OFFICE.

FRANK P. MURPHEY, OF DECATUR, ILLINOIS.

CORN-PLANTER.

1,020,363.  Specification of Letters Patent.  Patented Mar. 12, 1912.

Application filed July 30, 1910. Serial No. 574,659.

*To all whom it may concern:*

Be it known that I, FRANK P. MURPHEY, a citizen of the United States, residing at Decatur, in the county of Macon and State of Illinois, have invented certain new and useful Improvements in Corn-Planters, of which the following is a specification.

This invention relates more specifically to the construction and arrangement of the agitator for the feeding mechanism, to the means of operating the same, and to the construction of the kicker for ejecting grain from the pocketed feed plate.

The objects of the present invention are, to construct an agitator which will be operated with an oscillating movement and dispense with the gear connection ordinarily used for operating the agitator; and to provide the agitator, around a portion of its upper face. with an undulating surface, whereby an efficient breaking up and separating of the grain is produced.

A further object is to provide a kicker for ejecting the grain from the pocketed feed wheel, which kicker will comprise an acting portion and a contacting portion, the contacting portion resting against the grain and preventing the grain from flying upward when the acting portion strikes it to force it from the feeding wheel into the boot.

In the drawings, Figure 1 is a plan view of the casing, inclosing the feeding mechanism and the agitator, and showing the parts in operative position therein; Fig. 2 is a perspective vertical section, taken on line 2—2 of Fig. 1; Fig. 2ª is an enlarged sectional elevation, taken at right angles to the section on line 2—2 of Fig. 1; Fig. 3 is a side view of the kicker mechanism; and Fig. 4 is a plan view of the parts shown in Fig. 3.

The feeding mechanism and agitator are contained within a casing 8, which, as shown, is cylindrical in cross section, and is adapted to receive upon its upper end 9 a hopper of any usual and well known construction such as is ordinarily employed in mechanisms of this nature for holding a quantity of grain. Secured within the casing is a dome-shaped member 10, which presents a rounded surface, as more clearly shown in Fig. 2, for throwing grain to one side or the other of the casing, and said member is supported in the casing through the medium of a plurality of arches 11. Extending through the central portion of the dome-shaped member 10 is a stem or bolt 12, which forms a journal bearing for a hub 13 of an agitator 14; and, as shown more clearly in Fig. 2, said agitator is raised in the central portion thereof to extend up into a chamber 15 formed in the dome-shaped member.

The outer edge 16 of the agitator is formed to lie in a plane below the central portion of the agitator, and, as shown more clearly in Fig. 1, is provided around a portion thereof with a series of undulations 17, which serve, during the actuation of the agitator, to effectively break up any congealment of the kernels of grain which may take place, so that the grain is fed into the pocketed feeding wheel or disk in a loose condition, this, of course, being essential because of the fact that the feeding wheel is so designed that each pocket is intended to contain only a single grain, and, obviously, if the grain became compact, so that several of them adhered together, they would be in such shape as to render their positioning within the pockets of the feeding wheel impossible.

The agitator is provided, adjacent to its hub 13, with companion openings 18, through each of which extends a stem 19 of a member 20. As shown in Fig. 2, there are two of these members, but, inasmuch as they are exactly alike in every respect, reference characters are applied to but one, and the description of one is all that is deemed necessary at this time. The members are pivoted upon trunnions 21, which extend from a block 22, which is maintained in position by the bolt 12; and the members are formed with a portion extending below their pivotal center in a manner to form contacting lugs 23. Positioned below the block 22 is a shaft 24 operated from a suitable source of power, which shaft is provided with companion collars 25 and 26, each of which is provided with a contacting lug 27, adapted, when rotated, to engage at intervals the contacting lugs 23 of the members 20, and thus rock the members about their pivotal center. As shown in Fig. 2, these contacting lugs 27 extend in opposite directions from the shaft 24; hence, while one of them is in engagement with the lug 23 of one of the members 20, the other is disengaged from the lug 23 of the other member 20, and in this manner the members are actuated with an intermittent movement, the period of rest of one member occurring during the period of movement of the other member.

The rocking of the members 20, through the medium of the engagement of the contacts 27 with the contacts 23, swings the stems 19; and, as these stems are in engagement with the sides of the openings 18, it follows that a movement of the stem will impart movement to the agitator, and that, when one of the members is swung, it will move the agitator in one direction, and that, when the other member is swung, the members will be swung back to the position in which they originally occupied, thus moving the agitator in a reverse direction; hence an oscillatory movement is imparted to the agitator by the movements of the stems. Of course, both stems move in unison, but are not positively driven in unison, only one of the arms being positively driven in a single instance, the other arm being moved through the medium of the engagement of the walls of the slots 18 with the stem 19.

It will be noted that the members 20 are placed upon opposite sides of the pivotal center of the agitator; thus, when one of the stems is swung to turn the agitator in a certain direction, the opposite stems will be moved by the turning of the agitator, so that it will lie at the opposite angle to that in which the stem is lying which has moved the agitator. Hence, when the second stem is contacted and thrown to move the agitator, it will impart movement thereto in a reverse direction from that imparted to it by the first mentioned stem.

As shown in Fig. 1, the outer edge 16 of the agitator is provided, for only a portion of the circumference thereof, with undulations 17, and the parts are so positioned that sufficient movement will be given to the agitator, so that this undulated surface will pass back and forth a distance whereby it will act upon all of the grain which is capable of entering the pockets of the feed wheel. Driven by the shaft 24 is a pinion 28, which drives a gear ring 29, which imparts movement to a pocketed feed member 30, the connection between these two members being through the medium of lugs 31, as is old and well known in constructions of this nature. The feed member is shown in the form of a pocketed plate or disk 32, and positioned above said plate to prevent the accumulation of grain at points, except the outer edge thereof, is a disk 33 which is connected to the feed plate through the medium of lugs 34, which is also usual and well known in devices of this nature.

As shown in Fig. 2, the pinion for operating the feed plate is positioned upon the inner portion of the shaft 24, but, obviously, this pinion could be positioned upon the outer end of said shaft without departing in any way from the spirit of the invention. The shaft 24 is supported in bearings 35, which, as shown in Fig. 2$^a$, are secured to the casing 8. Secured upon the shaft 24, is a cam member 36 of the style and form shown in my Patent No. 960,187, issued to me May 31, 1910. This particular type of cam member is merely for illustrative purposes, and it is understood that this has no bearing whatsoever upon the present invention, the devices of the present invention being equally as well adapted to operate with various forms of differential feed.

The grain is discharged from the feed plate or disk through the medium of a kicker or ejector 60, provided with an acting end 61, shown more in detail in Fig. 3, said kicker being held normally downward under spring tension and riding upon the upper surface of the pocketed feed plate, so that, when an opening in the feed plate is brought into register with the kicker, the acting end 61 will descend into said opening and discharge the grain therefrom.

In order to prevent a tipping forward and forcing outward of the grain in the wrong direction when it is struck by the kicker, the kicker is provided with a contact portion 62, the acting end, as shown in Fig. 3, lying below the contact portion. During the striking operation of the acting end of the kicker, the contact portion 62 of the kicker will be resting directly above the grain, so that when the grain is struck by the acting end, it cannot turn up on edge and fly upward out of the pocket, but must pass downward out of the pocket, which, of course, is the direction desired in order to properly place it within the pocket 57. The kicker is further provided with a member 63, which lies above the feed plate and insures against the passing of more than one grain at a time into position to be discharged by the kicker. This latter device, however, is old and well known in the art, and the novelty in the present instance lies in the peculiar form of acting and contacting portions.

I claim:

1. In a corn planter, the combination with feeding mechanism, of an agitator, and intermittently actuated vibrating members operatively connected to be brought alternately into operative relation with said agitator for imparting a vibratory movement to the agitator, substantially as described.

2. In a corn planter, the combination with feeding mechanism, of an agitator, vibratory members for actuating the agitator, and means operatively connected for alternately bringing said members into engagement with said agitator, whereby a vibratory movement is imparted to the agitator, substantially as described.

3. In a corn planter, the combination with a feeding member, of means operatively connected for rotating the feeding member in one direction, an agitator, and means including vibratory members operatively connected to be brought alternately into engagement with said agitator and alternately move it in the same and reverse directions with respect to the feeding member, substantially as described.

4. In a corn planter, the combination with a feeding member, of means operatively connected for rotating the feeding member in one direction, an agitator, and means including vibratory members operatively connected to be brought alternately into engagement with said agitator and alternately move it in the same and reverse directions with respect to the feeding member, and a main driving shaft for operating the agitator and feeding mechanism, substantially as described.

5. In a corn planter, the combination with feeding mechanism, of an agitator, vibratory members disconnected from the agitator, and means operatively connected for intermittently actuating said members to bring them into operative relation with said agitator, the period of rest of one member occurring during the period of movement of the other, whereby a vibratory movement is imparted to the agitator, substantially as described.

6. In a corn planter, the combination, with feeding mechanism, of an agitator, companion members for operating the agitator, each member comprising a stem in engagement with the agitator and a contact, and means for engaging said contacts to actuate the stems, the period of engagement of one contact occurring during the period of non-engagement of the other, whereby an oscillatory movement is imparted to the agitator, substantially as described.

7. In a corn planter, the combination, with feeding mechanism, of an agitator, companion members for operating the agitator, each member comprising a stem in engagement with the agitator and a contact, a main driving shaft, members carried by said shaft and extending in opposite directions therefrom and adapted to engage said contacts, the period of engagement of one contact occurring during the period of non-engagement of the other, whereby an oscillatory movement is imparted to the agitator, substantially as described.

8. In a corn planter, the combination, with feeding mechanism, of an agitator, comprising a ring having its upper surface formed with undulations, and means operatively connected for rotating said ring with an oscillatory movement, substantially as described.

9. In a corn planter, the combination, with feeding mechanism, of an agitator, comprising a ring having its upper surface formed with undulations around a portion of the circumference thereof, and means operatively connected for rotating said ring with an oscillatory movement, the distance of travel of said ring being approximately equal to the length of the undulated surface thereof, substantially as described.

10. In a corn planter, the combination with feeding mechanism, of an agitator, vibratory members moving from fixed centers and operatively connected to said agitator, and means for intermittently actuating said members, whereby a vibratory movement is imparted to the agitator, substantially as described.

11. In a corn planter, the combination, with feeding mechanism, of an agitator, comprising a circular plate, companion pivotally mounted members for operating the agitator, each member comprising a stem and a contact, said plate being provided with openings through which the stems project, and means operatively connected for engaging said contacts, the period of engagement of one contact alternating with the period of engagement of the other, whereby an oscillatory movement is imparted to the agitator, substantially as described.

12. In a corn planter, the combination, with feeding mechanism, of an agitator, comprising a circular plate, companion pivotally mounted members for operating the agitator, each member comprising a stem and a contact, said plate being provided with openings through which the stems project, a driven shaft, members on said shaft for engaging said contacts, the period of engagement of one contact alternating with the period of engagement of the other, whereby an oscillatory movement is imparted to the agitator, substantially as described.

13. In a corn planter, the combination with feeding mechanism, of a kicker, comprising an acting portion or tip adapted to drop down into the cell, and a contacting portion in the form of a heel behind the tip of the kicker, the contacting portion being adapted to close over the cell during the kicking operation, whereby upward discharge of the grain is prevented during such operation, substantially as described.

FRANK P. MURPHEY.

Witnesses:
GEORGE C. DIXON,
MARGUERITE CAHILL.